(No Model.)

L. S. CRANDALL.
BICYCLE.

No. 546,004. Patented Sept. 10, 1895.

WITNESSES:

INVENTOR
Lucien S. Crandall
By Smith & Denison
ATTORNEYS.

UNITED STATES PATENT OFFICE.

LUCIEN S. CRANDALL, OF PARISH, NEW YORK.

BICYCLE.

SPECIFICATION forming part of Letters Patent No. 546,004, dated September 10, 1895.

Application filed March 27, 1893. Renewed March 13, 1895. Serial No. 541,589. (No model.)

*To all whom it may concern:*

Be it known that I, LUCIEN S. CRANDALL, of Parish, in the county of Oswego, in the State of New York, have invented new and useful Improvements in Bicycles, of which the following, taken in connection with the accompanying drawings, is a full, clear, and exact description.

My invention relates to mechanisms for steadying bicycles for mounting, or supporting them in an upright position when not in use.

My object is to provide such a mechanism comprising legs connected to a lever by which they can be swung forward to steady or temporarily support the bicycle for mounting, means being also provided, if desired, for automatically throwing them out of the way when out of use, further means being also provided for locking them in their projected position to give permanent support to the bicycle when out of use.

My invention consists in the several novel features of construction and operation hereinafter described, and which are specifically set forth in the claims hereunto annexed. It is constructed as follows, reference being had to the accompanying drawings, in which—

Figure 1:
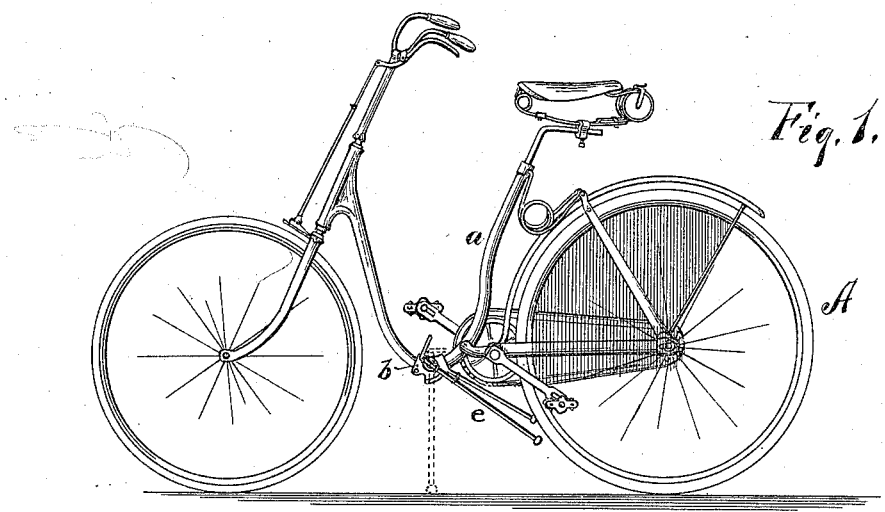
Figure 2:
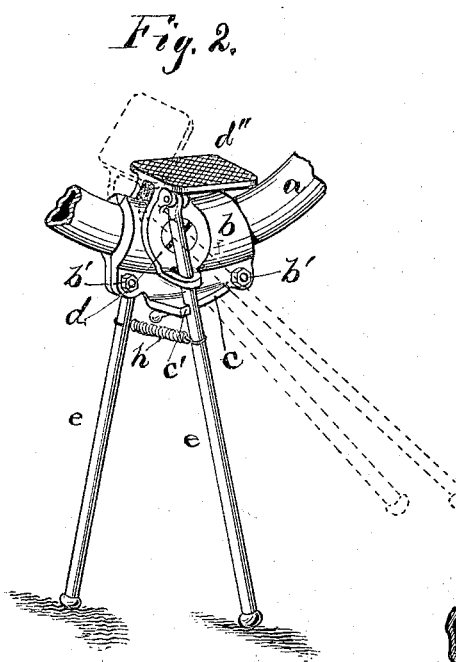
Figure 3:
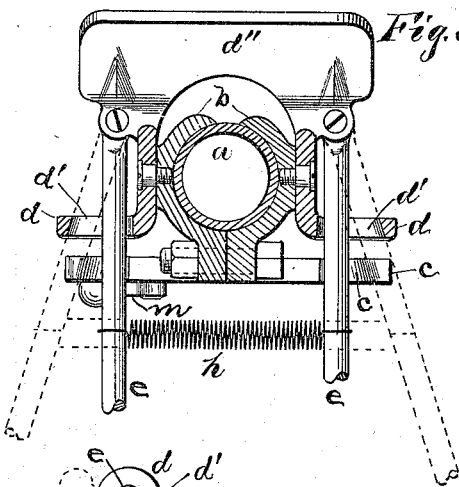
Figure 4:
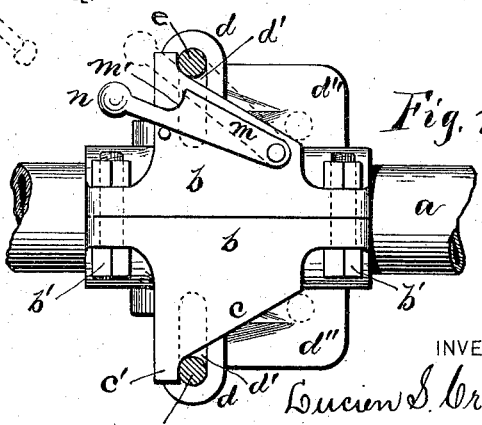

Figure 1 is a side elevation of a bicycle to which my invention is applied, showing the legs in full lines thrown back and in dotted lines as thrown into position for steadying or supporting it. Fig. 2 is an enlarged detail in plan perspective of the steadying or supporting mechanism, the dotted lines indicating the positions of the parts when out of use. Fig. 3 is an enlarged sectional detail in front elevation of the same, the dotted lines showing the legs in position to steady or support the bicycle. Fig. 4 is a sectional detail in bottom plan of same, showing particularly a lock for holding the legs when projected, the dotted lines indicating the lock applied to one of the legs.

A is a bicycle of any ordinary construction, here shown as a ladies' wheel for illustration only, as my invention is applicable to any style of bicycle, and $a$ is the frame-bar. Upon this bar the sectional clip $b$ is secured by a bolt or bolts $b'$, the bottom thereof being widened out and provided with the inclined or cam edges $c$, having, when desired, a stop-shoulder $c'$. Upon the sides of these clips the angle-bars $d$ are pivoted, each having in its horizontal portion a slot $d'$, and $d''$ is a foot lever or treadle secured to said angle-bars or integral therewith, so that in effect said treadle is pivotally mounted. The legs $e$ are hinged to said angle-bars, pass through the slots $d'$ therein, and are held in engagement with the cams $c$ by means of a suitable spring, as $h$, secured to said legs. Upon the bottom of said clip the lock-bar $m$ is pivoted, having a concavity $m'$ which engages with one of said legs, and having an arm or knob $n$, by which it is operated. When the foot is applied to the lever $d''$, pressing it down, said legs are forced downward, and forward, and outward, according to the divergence of said cams, until they strike the shoulders $c'$, in which position they will steady the bicycle so long as the pressure continues, as in mounting, which is a great convenience, especially to ladies, and is of utility to men also, as it avoids all of the jumping onto the saddle from the rear, and the rider can get one foot onto the pedal ready for starting before removing the other foot from the lever. When the pressure is released, the spring will throw the legs back into the position shown in Fig. 1. When desired to support the bicycle permanently, the legs are projected, as aforesaid, and the lock-bar swung into engagement with one leg, thereby locking both legs in their projected position, from which they are released by pushing back said lock-bar.

What I claim as my invention, and desire to secure by Letters Patent, is—

1. The combination with a bicycle frame, of a clip secured thereto having cam-edged projections, angle-bars pivoted upon said clip and having their outward arms slotted as shown a treadle secured to the vertical arms of said angle bars, and legs hinged to said vertical arms and passing down through said slots and engaging with said cam edges.

2. The combination with a bicycle frame, of a clip secured thereto having cam-edged projections, swinging angle-bars, slotted in their horizontal projections, a treadle secured to said angle-bars and adapted to swing them, and legs secured thereto engaging with said cam edges and passing through said slots and adapted to traverse them longitudinally when the angle-bars are swung, and means to automatically retract said legs when the pressure is removed from the treadle.

3. The combination with a bicycle frame, of a clip secured thereto, a lever pivoted upon said clip, legs hinged to said lever, and a lock-bar adapted to engage with one of said legs.

In witness whereof I have hereunto set my hand this 24th day of March, 1893.

LUCIEN S. CRANDALL.

In presence of—
C. W. SMITH,
HOWARD P. DENISON.